Patented Dec. 17, 1946

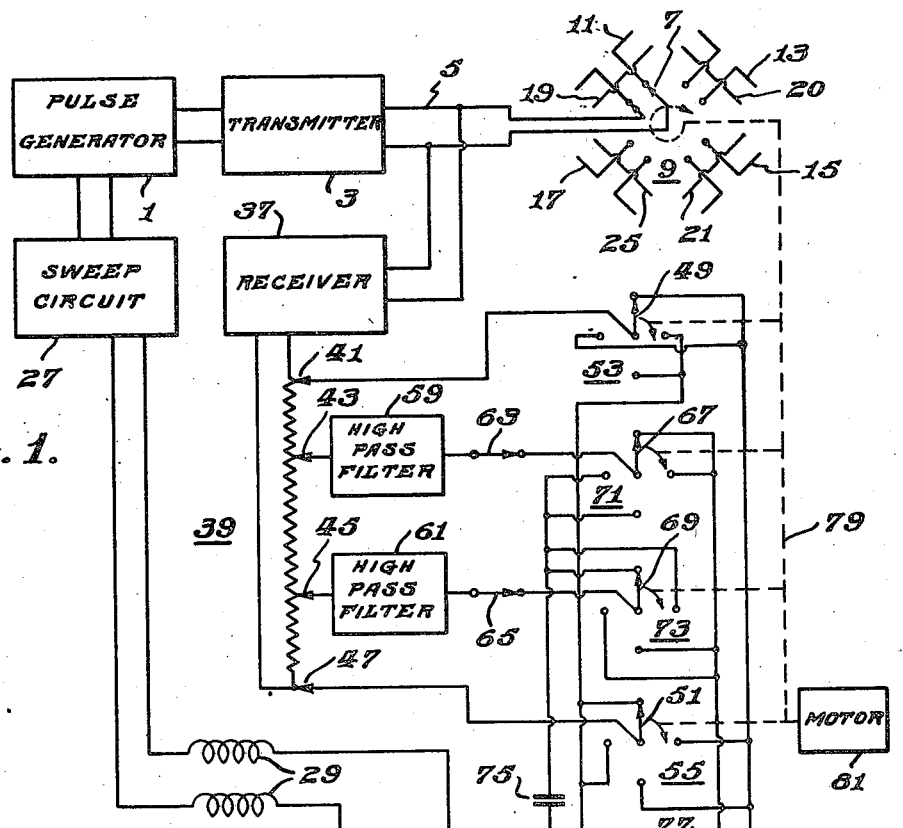
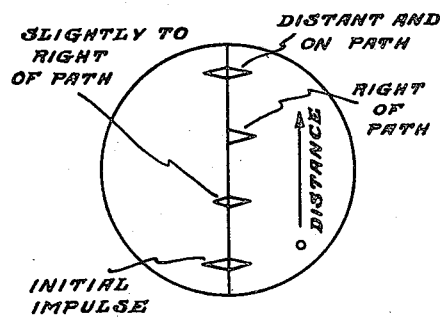
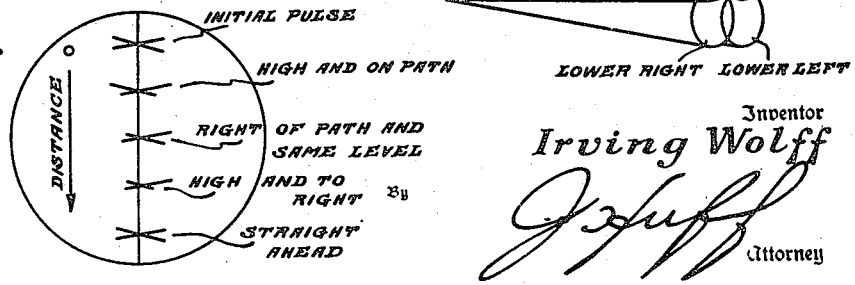

2,412,702

UNITED STATES PATENT OFFICE 2,412,702

OBJECT DETECTION AND LOCATION

Irving Wolff, Merchantville, N. J., assignor to Radio Corporation of America, a corporation of Delaware Application February 28, 1939, Serial No. 259,057

11 Claims. (Cl. 250—1.62)

This invention relates to object detection and location, and more specifically to indicating the distance from a given point to an object and the location of the object with respect to one or more reference zones.

Objects have been detected by radiating pulses of radio frequency energy and observing the time elapsing between the radiation and reception of the reflected pulses. The elapsed time is proportional to the sum of the distances between the point of radiation and the pulse reflecting object and from the object to the receiver. The distance indication does not distinguish the bearing of the object. If the object detection system is used on a mobile vehicle, it is highly desirable to indicate the bearing of a reflecting object with respect to the line of movement of the vehicle. If the vehicle is an airplane, it is desirable to indicate the location of an object as above or below, and to the left or right of the line of flight, as well as its distance from the plane. In this manner the observer may determine if the reflecting object represents an obstacle to be avoided.

As one of the objects of the invention, means are provided for indicating radio wave reflecting objects. Another object is to provide means for indicating the bearing of an object reflecting radio pulses. Another object is to provide means for indicating the distance and bearing of an object reflecting radio waves. An additional object is to provide means for detecting the distance and location of objects with respect to reference zones.

The invention will be described by referring to the accompanying drawing in which Figure 1 is a schematic circuit diagram of one embodiment of the invention;

Figure 2 is an illustration of the pattern of the radiated fields; and

Figures 3 and 4 are illustrations of the response patterns obtained, respectively, with reference to two and four zones of radiation.

A pulse generator 1 is connected to a transmitter 3. The output of the transmitter is connected by a transmission line 5 to the movable contacts 7 of a four position switch 9. Antennas 11, 13, 15, 17 are connected to the respective fixed contacts of the switch 9. The antennas may be dipoles and may include reflectors 19, 20, 21, 25 or other means for beaming the radio frequency energy radiated therefrom. The antennas are arranged so that the radiation falls in zones which may be directed to the left and right, and up and down with respect to a reference line as shown in Fig. 2.

The pulse generator 1 is also connected to a sweep circuit generator 27. The output of the sweep generator is applied through choke coils 29 to the vertical deflecting elements 31 of a cathode ray tube 33. The cathode ray tube is connected to a suitable power source 35.

The four directive antennas 11, 13, 15, 17, from which the outgoing pulses of radio frequency energy are radiated, may also be used for receiving the reflected pulses. The details of one circuit for using a common antenna for transmitting and receiving pulses are disclosed in the copending application entitled "Signalling system", Serial No. 184,354, filed January 11, 1938, Patent No. 2,401,717, granted June 4, 1946, by Irving Wolff and William D. Hershberger. If desired, separate antennas may be used for transmitting and receiving. In either event the antenna for receiving is connected to a receiver 37. The output of the receiver, which may be of the superheterodyne type, is connected to a potentiometer 39, which includes four connections 41, 43, 45, 47. The outer pair 41, 47 of the potentiometer connections are joined respectively to the movable contacts 49, 51 of a pair of four position switches 53, 55. The fixed contacts of these switches are connected to the horizontal deflecting elements 57 of the cathode ray tube in such order that the horizontal deflecting elements may be alternately reversely connected to the outer potentiometer connections 41, 47.

The inner connections 43, 45 of the potentiometer 39 are connected respectively through high pass filters 59, 61 and switches 63, 65 to the movable contacts 67, 69 of a second pair of four position switches 71, 73. The fixed contacts of the second pair of switches are connected respectively through capacitors 75, 77 to the vertical deflecting elements 31 of the cathode ray tube. The contacts of the switches 71, 73 are so connected that the vertical deflecting elements may be alternately and reversely connected to the inner potentiometer connections 43, 45. The movable contacts 7, 49, 51, 67, 69 are coupled to a common shaft 79 which is driven by a motor 81.

The operation of the system is as follows: The pulses of the order of a few tenths of a microsecond duration are generated at intervals of the order of fifty microseconds. These pulses trigger the transmitter which is successively connected to the antennas 11, 13, 15, 17. During the successive contacts a train of pulses are successively radiated in differently directed and substantially conical zones which overlap as shown in Fig. 2. By way of example, the axes of the upper right, upper left, lower right and lower left cones may be separated by about ten degrees. The trains of pulses are radiated from the separate antennas and, if a common antenna is used, the reflected pulses are received on the same antenna during the fifty microsecond intervals.

The received reflected pulses are applied to the horizontal deflecting electrodes which are reversed in synchronism with the radiation to the left or right as the case may be. In this manner the cathode ray indications or deflections are given "sense." That is, deflections to the right indicate reflecting objects in the zones of radiation directed to the right; deflections to the left indicate reflecting objects in the zones directed to the left. At the same time the reflections are indicated to "right" or "left," the vertical deflecting elements are alternately and reversely coupled to the receiver in synchronism with the direction of radiation in the upper or lower zones. The downwardly sloping deflections indicate reflections from objects in the lower zones of radiation.

The length of the deflecting lines corresponds with the intensity of the reflected pulse, and the intensity in turn depends upon the location of the reflecting object with respect to the zones of radiation. Thus equal long deflections in the upper portion of the trace indicates objects at the junction of the upper right and upper left zones. The reflected pulses will also be displaced with respect to the initial or outgoing pulse along a vertical coordinate because the sweep generator potentials are applied to the vertical plates. The amount of vertical displacement is a function of distance as previously explained. In order that the received pulses shall not be applied to the sweep generator the chokes 29 are included and in like manner the capacitors 75, 77 and the high pass filters 59, 61 keep the sweep potentials from being applied to the potentiometer 39. Several types of distance and location indication are illustrated in Fig. 4 in which the cross or traces of equal length at the top of the figure indicate direct reception of the initial outgoing pulses due to the outgoing signals actuating the receiver. The second (from the top) cross indicates that reflected signals are received from a relatively nearby object because the trace is near zero on the distance scale and since the traces are longer (and therefore the signals are stronger) in the upper portion than the lower portion of the cross, the object is located mostly in the upwardly directed zones of radiation. Finally since the length of the cross on either side of the center line is equal, it follows that the reflecting object is centered with respect to the right and left zones of radiation. The third (from the top) cross indicates that the object reflecting the received signals is (1) at mid-range with respect to the distance scale; (2) to the right of the center line dividing the right and left zones of radiation; and on the approximate level of the plane dividing the upper and lower zones of radiation because the reflected signals in the upper and lower zones are nearly equal as indicated by the nearly equal lengths of the cross lines as they extend upwardly and downwardly on the right side of the center line. In a similar manner the next cross indicates reflections from an object high and to the right of the reference and at three-quarters of the maximum range. The last cross indicates reflections from an object straight ahead at the maximum range or distance. It should be understood that the several indications will appear simultaneously if the motor is operated at a rate of the order of the persistence of vision.

In the foregoing specification, an object detection and location system has been described. Trains of pulses are successively radiated in differently directed zones. In synchronism with the radiation of such trains, a receiver is connected to the deflecting elements of a cathode ray tube. The deflecting elements are connected in distinctive combinations so that the ray deflections are given a sense corresponding to the radiation zones. The ray is also deflected along a coordinate in synchronism with the pulse rate so that the distance of a reflecting object is indicated.

In some installations the location of an object with respect to a reference line may be sufficient; in such cases the switches 63, 65 may be opened, whereby the cathode ray deflections will be limited to coordinates indicating distance and to the "left" or "right" of a reference line, provided the antennas are suitably oriented. As illustrated in Figure 3 the signal indications represent the distance of the reflecting object and its position to the right or left of the reference path but the location of the object with respect to a horizontal reference plane is omitted. The scale of distance in Figure 3 begins at the bottom of the figure with the initial impulse. The second indication shows a larger diamond trace to the right, thus indicating a reflecting object slightly to the right and at a third of the maximum distance range. The third indication shows the object is at two-thirds of the maximum range and entirely to the right of the reference line. The final trace indicates an object at maximum range and on the path or in the vertical reference plane. In the application of the invention the sweep circuit causes the cathode ray to sweep normally along the distance scale while reflected signals applied through the receiver deflect the ray to right or left to form the diamond traces of Figure 3 or the crosses of Figure 4 at points along the distance scale corresponding to the location of the object with respect to predetermined reference planes and corresponding to the distance of the wave or signal reflecting object, respectively. It should be understood that any system of simultaneous commutation may be substituted for the motor driven switches. In like manner the invention is not limited to any specific antenna array or radiation pattern. Furthermore, it should be understood that the same method may be applied to other forms of radiation such as light, heat and sound. In these cases a light transmitter and light receiver, a heat radiator and a heat responsive element, or a sound radiator and a sound receiver are substituted respectively for the radio wave transmitter and radio wave receiver.

I claim as my invention:

1. The method of detecting and locating objects which includes radiating pulses in discrete and predetermined zones disposed in pairs on opposite sides of each of a pair of intersecting reference planes, receiving said pulses after reflection from an object within said zones, making said received pulses visible, and indicating the zone from which the reflection is received by the orientation of the visible indications with respect to a reference line.

2. The method of detecting and locating objects which includes radiating trains of pulses in discrete and predetermined zones disposed in pairs on opposite sides of each of a pair of intersecting reference planes, receiving said trains of pulses after reflection from an object within one or more of said zones, converting said received pulses into visible indications, and designating the zone from which the reflection is received as a function of the orientation of the visible indications with respect to a single reference line.

3. The method of detecting and locating objects which includes radiating pulses in discrete and predetermined zones disposed in pairs on opposite sides of each of a pair of intersecting reference planes, receiving said pulses after reflection from an object within said zones, indicating the reception of said reflected pulses, and further indicating the zone or zones including the object from which the reflection is received as a function of the orientation of said indications of reception with respect to a reference line.

4. The method of detecting and locating objects which includes radiating trains of pulses in discrete and predetermined zones disposed in pairs on opposite sides of each of a pair of intersecting reference planes, receiving said trains of pulses after reflection from an object within one or more of said zones, indicating by visible lines the reception of said reflected pulses, and further indicating the zone including the object from which said reflection is received by the relation of said visible lines to a single reference line.

5. The method of claim 1 including the additional step of indicating the time between the radiation of one pulse and the reception of said pulse after reflection.

6. In the method of claim 2 the additional step of indicating the sum of the distances from the point of said radiation to the object, and from the object to the point of said reception.

7. The method of detecting and locating objects which includes successively radiating trains of radio frequency pulses in discrete and predetermined zones disposed in pairs on opposite sides of each of a pair of intersecting reference planes, receiving said trains of pulses after reflection from an object within said zones, indicating the reception of said reflected pulses by visible lines corresponding to said reception, and further indicating the zone or zones from which said reflections are received by relating said visible lines to a single reference line.

8. The method of claim 7 including the additional step of indicating the distance from the point of radiation to the reflecting object and back to the point of reception.

9. In an object detecting and locating system, means for generating pulses of radio frequency energy, means for radiating successively said pulses in discrete and predetermined zones disposed in pairs on opposite sides of each of a pair of intersecting reference planes, means for receiving said pulses after reflection from an object within said zones, a cathode ray tube connected to said receiving means and including a reference line, and means for applying said received pulses to said cathode ray tube to deflect said ray with respect to said reference line to indicate the zones within which the reflecting objects are disposed as a function of the orientation of said cathode ray deflections.

10. In a device of the character described, means for establishing pulses of radio frequency energy, means for radiating successively said pulses in zones having their axes differently directed, means for receiving said pulses after reflection from an object within said zones, a cathode ray tube, means applying said received pulses for deflecting said cathode ray along coordinates indicating said zones, and means for further deflecting said cathode ray in synchronism with the periods between said pulses, whereby the distance of a reflecting object is indicated.

11. In a device of the character described a generator of pulses, means for applying said pulses to a radio transmitter to thereby establish pulses of radio frequency energy, means for successively radiating said radio frequency pulses in correlated zones, a radio receiving device, a cathode ray tube including a pair of vertical and a pair of horizontal deflecting elements, means for alternately and reversely connecting said electrodes to the output of said receiving device in synchronism with the successive radiation in said zones, a sweep generator connected to said pulse generator, and means connecting said sweep generator to a pair of said deflecting elements.

IRVING WOLFF.